Sept. 19, 1944. S. J. PUGATZ 2,358,591
APPARATUS FOR TREATING LIQUIDS
Filed May 15, 1941 4 Sheets-Sheet 1
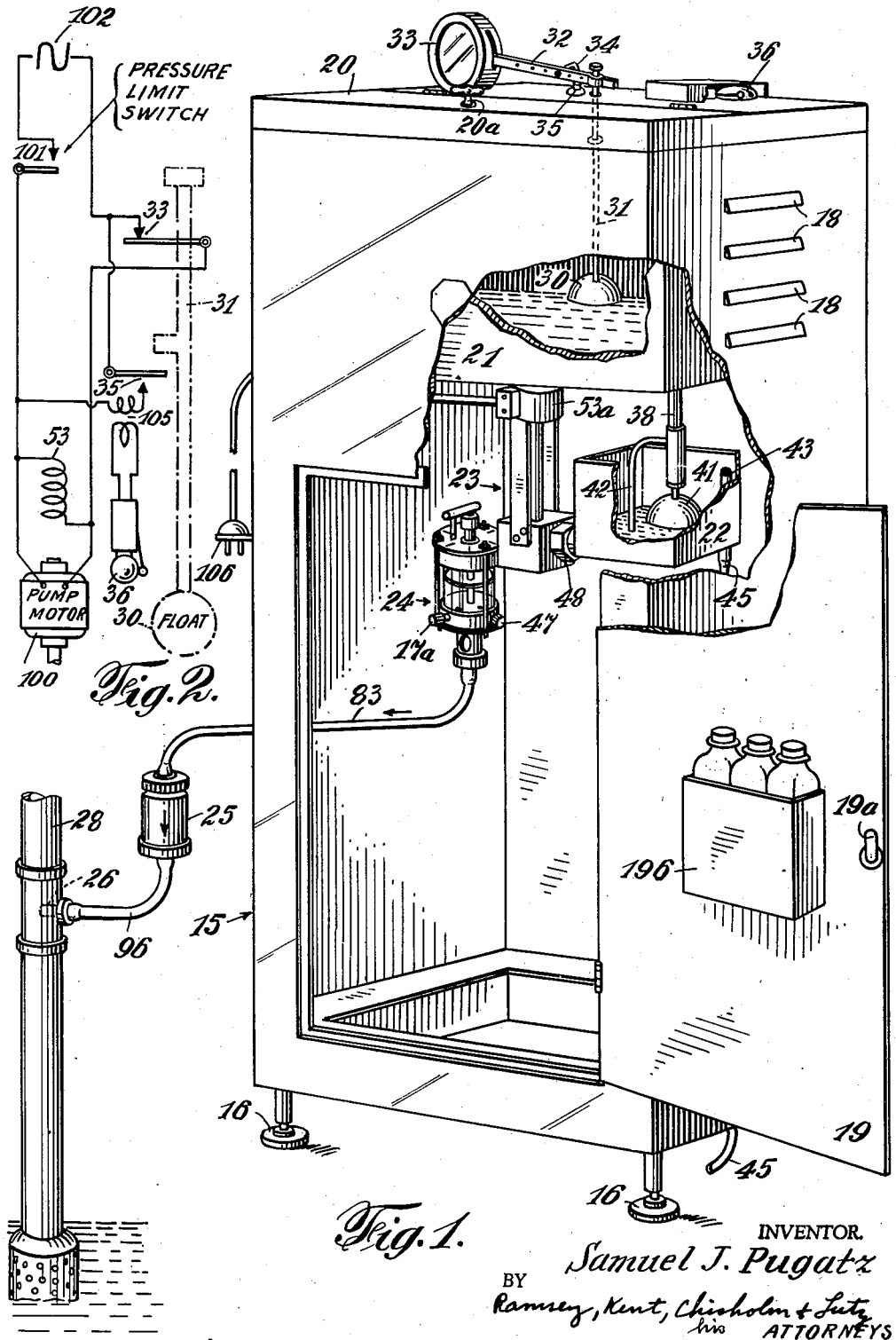
INVENTOR.
Samuel J. Pugatz
BY Ramsey, Kent, Chisholm & Lutz
his ATTORNEYS Sept. 19, 1944. S. J. PUGATZ 2,358,591
APPARATUS FOR TREATING LIQUIDS
Filed May 15, 1941 4 Sheets-Sheet 2
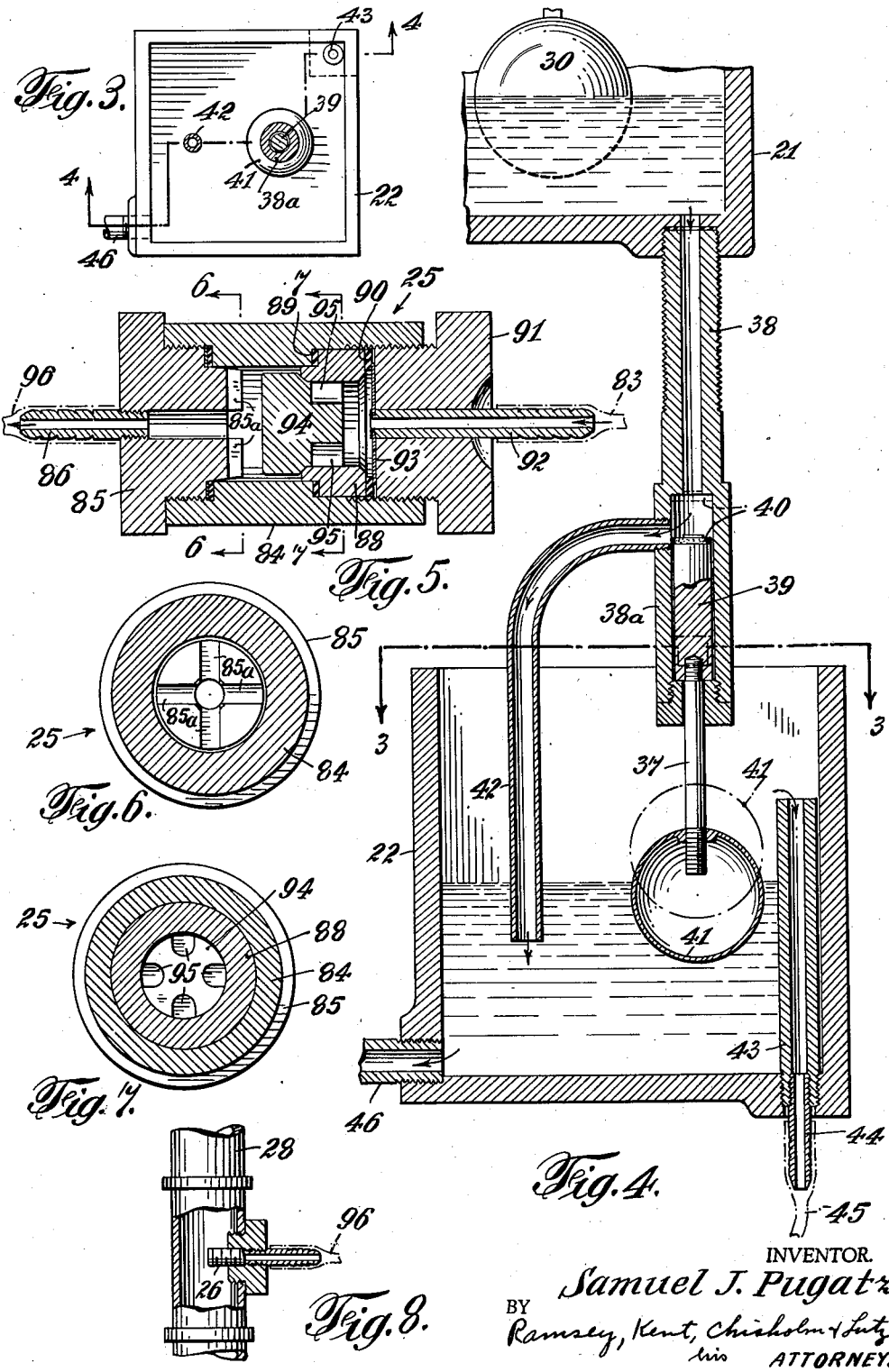
INVENTOR.
Samuel J. Pugatz
BY Ramsey, Kent, Chisholm & Lutz
his ATTORNEYS

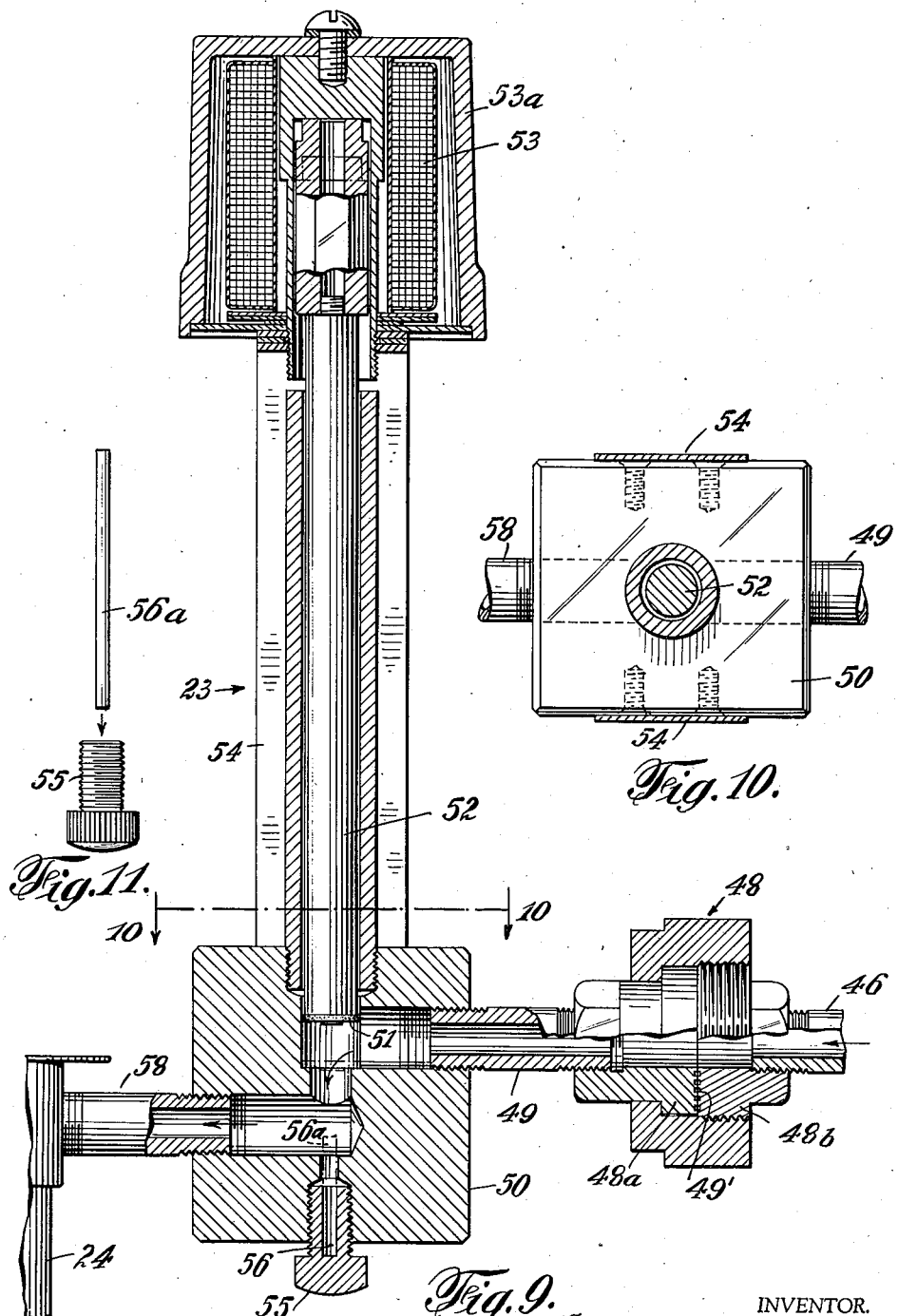

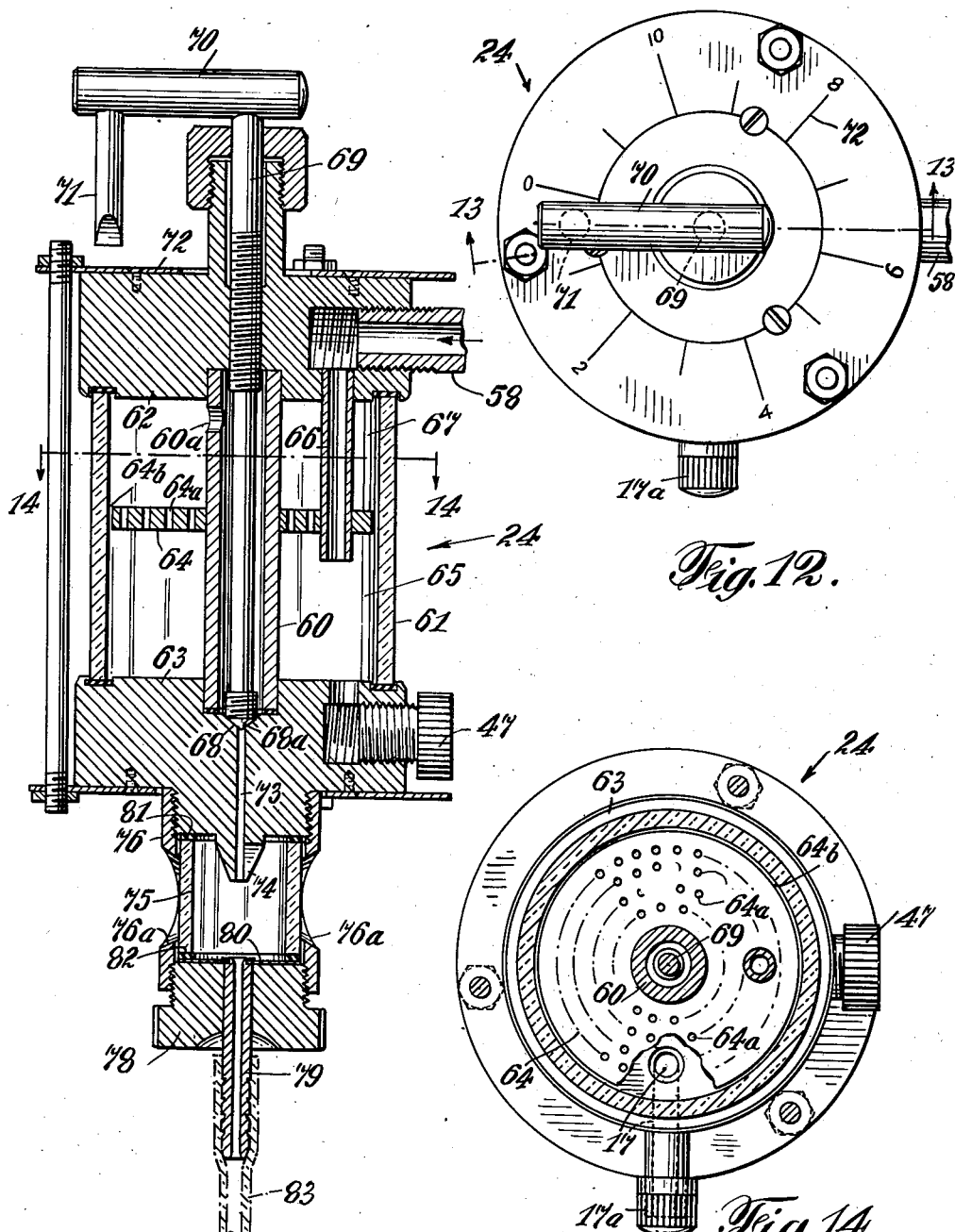

Patented Sept. 19, 1944

2,358,591

UNITED STATES PATENT OFFICE 2,358,591

APPARATUS FOR TREATING LIQUIDS

Samuel J. Pugatz, Hurleyville, N. Y.

Application May 15, 1941, Serial No. 393,509

6 Claims. (Cl. 210—28)

This invention relates to chlorinating apparatus for treating domestic water supplies, swimming pools, sewage, etc. The treating reagent is a liquid having available chlorine; and a reagent much used for the purpose is an aqueous solution of sodium hypochlorite. Other liquid reagents may, of course, be handled by the same apparatus, to effect treatments other than chlorination. However, since the usual treatment is chlorination, and since such apparatuses are known as "chlorinators," that terminology will be used herein regardless of the particular reagent that may be used.

For many years city water supplies, swimming pools, and sometimes sewage have been treated with chlorine to kill certain bacteria. In treating drinking water supplies and swimming pools, the amount of chlorine introduced into the water is relatively small and the "residual" chlorine in the water must be kept within relatively close upper and lower limits, those limits being higher for swimming pools than for drinking water supplies. The chlorine dosage required to keep the "residual" chlorine within the required limits varies greatly with the character and condition of the untreated water and may undergo marked seasonal and other variations for water from a single source. This inherently complicates the problem of proper chlorination and necessitates rather continual supervision of the process.

The application of chlorination to small individual water supplies, such as rural wells and springs, has been greatly limited due to the cost of equipment available for the purpose, the constant attention required in servicing and regulating the apparatus, and the relatively high degree of knowledge and skill needed by the operator to care for and regulate the apparatus.

A general object of the present invention is to provide an improved, reliable, and simple apparatus suitable for treating (e. g. chlorinating) individual or small water supplies, swimming pools, and sewage disposal systems.

Another object of the invention is to provide chlorinating apparatus which can be made and sold as a unit for installation on farms, at rural summer hotels, rural residences, etc., and which is of such a character that the apparatus can be properly controlled and serviced by a relatively unskilled person.

Other objects of the invention are to improve the construction of, increase the reliability of, improve the performance of, and simplify the maintenance and control of chlorinating apparatus.

Various other and detailed objects of the invention will be apparent from the following disclosure of the best form in which I have contemplated applying the invention.

Fig. 1 of the drawings is a partly diagrammatic view showing in perspective apparatus of the present invention, with parts cut away, connected to a water supply system.

Fig. 2 is a schematic diagram showing electrical circuits of connections which may be used with the apparatus in Fig. 1.

Fig. 3 is a top view, from line 3—3 of Fig. 4, showing a constant level reagent tank which is incorporated in the apparatus.

Fig. 4 is a vertical section taken in general on line 4—4, Fig. 3, showing the constant level reagent tank and a fragment of a reagent-supply tank which feeds the constant level tank.

Fig. 5 is a central longitudinal section of a check valve through which the reagent (so-called chlorine solution) is fed to the water to be treated.

Fig. 6 is a cross section of the check valve taken on line 6—6 of Fig. 5.

Fig. 7 is a cross section of the check valve taken on line 7—7 of Fig. 5.

Fig. 8 is a detailed view, partly in section and partly in elevation, showing the connection of the chlorinating apparatus to a water supply line.

Fig. 9 is a vertical section, partially in elevation, showing a solenoid operated valve for starting and stopping the flow of the so-called chlorine solution.

Fig. 10 is a horizontal section taken in general on line 10—10 of Fig. 9.

Fig. 11 is an elevation of a manual control member which may be used in connection with the valve in Fig. 9.

Fig. 12 is a top plan view of a filter and metering valve assembly through which the so-called chlorine solution passes.

Fig. 13 is a vertical section of the filter and metering valve assembly taken in general on line 13—13 of Fig. 12.

Fig. 14 is a horizontal section through the filter taken in general on line 14—14 of Fig. 13.

Reference will now be had to Fig. 1. A sheet metal cabinet 15 stands on rubber supports such as 16 (two shown) and is provided with ventilating louvers 18 and hinged doors 19 and 20. Door 19 gives access to the lower portion of the cabinet and is adapted to be latched closed by a latch 19a. On the inside of door 19 there may be provided one or more receptacles or pockets 19b to receive bottles of concentrated solution for replenishing the reagent in the supply tank, or to receive a test set used for determining the amount of residual chlorine in the water. Door 20 gives access to the top of the cabinet, particularly to the solution supply tank, and is adapted to be latched closed by a latch 20a.

Mounted in the upper portion of the cabinet is a solution or reagent supply tank 21 from which the solution is fed by gravity to a constant level tank 22 mounted beneath the supply tank. A solenoid operated valve at 23 opens and closes a conduit leading from the constant level tank 22 to a filtering and metering valve assembly designated as a whole by 24. From assembly 24 the solution passes through a check valve 25 and is delivered at 26 into a pipe line 28 through which flows the liquid to be chlorinated. The pipe line 28 is shown, by way of example, as a suction line leading from a well or reservoir of water to a pump, but by appropriate connection the solution can be delivered to other pumping systems or to a sewage system.

The solution-supply or reagent-supply tank 21, which is manually filled, is provided with a float 30 connected by a rod 31 to the control arm 32 of a commercial mercury switch 33. Switch 33 is normally closed, but is arranged to open a circuit (for a purpose to be described later) when tank 21 has become nearly empty. Arm 32 carries an angle finger 34 which may be selectively positioned along the arm. This finger is arranged to engage a push button switch 35 to close a circuit as tank 21 approaches an empty condition. The circuit controlled by switch 35 operates an alarm such as a bell 36, which will be referred to later.

Fig. 4 shows a depending discharge conduit 38 which may be threaded into and be in communication with the bottom of solution-supply tank 21. The bottom portion 38a of conduit 38 is counterbored to provide a cylinder for a piston-like member 39 carrying a valve disc 40 which is adapted in uppermost position to seat and arrest flow through conduit 38. Attached to the bottom of member 39 is a rod 37 connected to a float 41 that is located in the constant level tank 22. As the liquid level rises in constant level tank 22, valve disc 40 is raised and cuts off the flow through conduit 38 and branch conduit 42. As soon as the liquid level in tank 22 drops slightly, valve 40 begins to open, admitting more liquid through conduit 38 and branch conduit 42, until valve disc 40 is again seated through action of float 41. Thus the liquid in tank 22 is maintained at substantially constant level. As shown in Fig. 4, the center of displacement of float 41 is above the discharge end of branch conduit 42, so that liquid entering the constant level tank 22 through branch conduit 42 is discharged beneath the surface of the liquid without any splashing. To prevent extreme overfilling of tank 22 in the event of mishap, or in the event of valve 40 sticking and failing to close, an overflow pipe 43 is provided with its inlet point at a level substantially above the normal level of liquid in tank 22. This overflow pipe 43 leads to a nipple 44 projecting from the bottom of tank 22 and to which a soft rubber hose 45 is attached to conduct any overflowing liquid to a point beneath the cabinet, as shown in Fig. 1.

Near the bottom of constant level tank 22 there is an outlet nipple 46 adapted to be connected by union 48 (Fig. 9) to a second nipple 49. As shown in Fig. 9, union 48 may be constructed with face-to-face meeting surfaces between union elements 48a and 48b, the meeting surfaces being provided with a series of registering concentric annular grooves as shown at 49'.

Nipple 49 conducts the reagent or solution into a bored block 50 within which there is a valve disc 51 adapted to arrest flow through the block 50. Valve disc 51 is mounted on the bottom of a plunger 52 that is adapted to be raised upon energization of a solenoid 53. So long as solenoid 53 is energized, the valve 51 is held open, but when energization of the solenoid 53 ceases, plunger 52 drops, valve 51 closes, and cuts off the flow of solution through the block 50. The casing 53a for solenoid 53 may be supported from block 50 by means of a pair of upstanding straps 54, 54 (see also Fig. 10). In the bottom of block 50 there is a removable threaded plug 55 for cleaning purposes. Additionally, this plug is provided with a bore 56 to telescopically receive a removable rod-like member 56a (see Fig. 11). When this rod is inserted into plug 55 and the plug is screwed into block 50, the upper end of rod 56a mechanically raises valve 51. This construction provides for manual opening of valve 51 in case solenoid 53 fails to operate. The solution discharge from block 50 is through a nipple 58 on the end of which is mounted the filtering and metering valve assembly 24, shown in Fig. 1.

The details of the filtering and metering valve assembly 24 are best seen in Figs. 12, 13 and 14. This assembly includes a central tube 60 within a glass cylinder 61, both the tube and cylinder being clamped between upper and lower header members 62 and 63. Glass cylinder 61 is sealed to both the upper and lower header members and the tube 60 is sealed to at least the lower header member. Supported about midway on tube 60 is a horizontal filtering disc 64 having numerous small liquid passages 64a and a narrow annular liquid passage 64b between the edge of disc 64 and the wall of cylinder 61. Solution entering through nipple 58 passes downwardly through tube 66 to chamber 65 beneath filtering disc 64. From this chamber the solution flows upwardly through filtering screen 64 into chamber 67, thence through inlet 60a in the top of tube 60 and down within tube 60 where the flow is controlled by a valve at 68. The valve at 68 includes a vertically movable valve member 68a formed on the end of a rod 69 that is threaded through upper header 62. The rod 69 is provided with an arm 70 carrying an index 71 which cooperates with a circular scale 72 above header 62. Thus index 71 and scale 72 provide a means for gaging the setting of valve 68a to meter the flow from tube 60 through passageway 73 to drip nozzle 74 located in a sight glass 75.

Sight glass 75 is located within a bushing 76 having one or more pairs of aligned sight holes 76a. Bushing 76 is threaded onto a boss projecting from the bottom of header 63, and the lower end of bushing 76 is screw threaded to receive a removable screw plug 78. Screw plug 78 is swivelly pierced by a nipple 79 having a disc 80 attached in a fluid tight manner to its upper end. Soft rubber gaskets 81 and 82 are provided at the upper and lower ends of sight glass 75. As plug 78 is screwed into bushing 76, the plug turns freely about nipple 79 and brings disc 80 into sealing engagement with gasket 82, at the same time forcing sight glass 75 into sealing engagement with gasket 81.

Lower header 63 has a passage 17, closed by a removable cap 17a. By removing cap 17a, chamber 65 may be drained of sediment and a cleaning wire can be inserted through passage 17.

Beneath nipple 58, the lower header 63 is bored and threaded in a manner corresponding to the bores in upper header 62 which receive tube 66 and nipple 58. This formation is closed by a removable plug 47 (Figs. 14 and 1). To change the rate of feed of solution to filtering unit 24, plug 47 can be shifted to upper header 62 (replacing nipple 58) and assembly 24 be elevated and the connection of nipple 58 be made to lower header 63 (where plug 47 was removed). In making this change tube 66 is transferred to the lower header, where it is frictionally held in the bore provided, just as it is frictionally held in the bore in upper header 62. The proportions of parts are such that when tube 66 is in the lower header, it discharges the solution upwardly into chamber 65 and beneath screen 64. The hole in screen 64 from which tube 66 is removed, may be suitably plugged.

Attached to nipples 79 is a thick-walled soft rubber tube 83 leading to check valve assembly 25 (Fig. 1), the details of which are shown in Figs. 5, 6, and 7. In these figures there is shown a generally cylindrical body 84 closed at one end by a screw plug 85 having an outlet nipple 86. The inner face of plug 85 is provided with four intersecting radial grooves 85a which act as fluid passages. Fitted into the opposite end of body 84 is a valve-seat ring 88 which cooperates with sealing gaskets 89 and 90. A screw plug 91 is swively pierced by a nipple 92 that is attached in a fluid tight manner to a disc 93. When the plug 91 is screwed in place, disc 93 is brought into fluid tight engagement with gasket 90 and sealing pressure is transmitted to gasket 89. Captive within, and slidable with respect to valve-seat ring 88, is a movable valve element 94 having four fluid passages 95. The solution entering the check valve assembly through nipple 92 passes through fluid passages 95, and moves the check valve element 94 against the inner end of plug 85. The solution flows from passages 95 around the head of check valve element 94 and through passages 85a to outlet nipple 86. In case of conditions which would tend to cause reverse flow, check valve element 94 is moved against its seat in valve ring 88 (to the position shown in Fig. 5) and thereby preventing return flow.

Nipple 86 is connected by a thick-walled rubber tube 96 to a nipple 26 connected into the water suction line 28 as shown in Figs. 1 and 8.

In connection with the apparatus suitable electrical connections may be used, such as shown in Fig. 2. The motor 100 may be the motor of a conventional automatic pressure system used for pumping water. Such systems are conventionally provided with a pressure limit switch that closes and starts the motor when the pressure in the storage tank has dropped to a predetermined figure. This pressure limit switch is indicated at 101 in Fig. 2. As the storage tank fills, the pressure rises and when the pressure reaches a predetermined upper limit the pressure limit switch opens and breaks the circuit to the motor.

In Fig. 2 the electrical circuit of the pump motor 100, from the source of electricity 102, not only passes through the pressure limit switch 101, but also through the float control mercury switch 33 (see also Fig. 1). Switch 33 is closed so long as there is sufficient reagent or solution in supply tank 21. However, as tank 21 approaches an empty condition, the float 30 acts to open switch 33 and breaks the circuit to pump motor 100. Thus the pumping of water will be automatically suspended in the event that the so-called chlorine solution in the chlorinating apparatus dwindles toward the vanishing point. This is insurance against any water being pumped without proper chlorination. When pressure limit switch 101 closes to start the pump motor, solenoid 53 (see also Fig. 9) is energized, opens valve 51, and holds it open. Thus, as soon as the pump motor is started, the chlorine solution is supplied to the water system. When pressure limit switch 101 is opened to stop the pump motor, solenoid 53 is de-energized and valve 51 is automatically closed (by the weight of plunger 52) to cut off the flow of chlorine solution.

In Fig. 1 there is shown a push-button switch 35 which is operated as the float 30 approaches its lowermost position. This push-button switch 35 is also shown diagrammatically in Fig. 2. As the tank 21 approaches an empty condition the float actuated mechanism closes the switch 35, thereby energizing transformer 105 to operate alarm 36 which is shown as a bell. Alarm 36 may, however, be a light or other suitable visual or audible signal, and instead of being located on top of the cabinet as shown in Fig. 1, it may be located at any point (in the house or otherwise) where it is most likely to attract the attention of the proper person. Preferably the switches 35 and 33 are so coordinated with float 30 that the switch 35 will close and the alarm 36 be actuated during a warning interval before switch 33 has opened to stop the pumping motor. To this end, switch 35 may be arranged to have a relatively long path of movement after it is closed, thereby allowing for further drawing of solutions from tank 21 before switch 33 opens and stops the pump.

The electrical system shown in Fig. 2 may be so arranged that the parts of it which are associated with cabinet 15 run to one or more suitable plural-prong plugs 106 (Fig. 1) arranged for plug-in connection to the pump motor electric system. In the specific circuit arrangement shown in Fig. 2, the operation of alarm 36 is dependent upon the pressure limit switch 101 being closed, which condition would normally obtain when operation of alarm 36 is called for. However, connection from the primary of transformer 105 and from switch 35 may be made directly to the source of current (not through pressure limit switch 101) so that operation of alarm 36 would be continued even in the event that pressure limit switch 101 opened while the alarm was in operation.

All parts with which the chlorine solution comes in contact are preferably made of materials not attacked by the solution. Such materials include rubber, hard rubber, porcelain, glass and silver. I have used soft rubber for tubes such as 82 and 96. I have used hard rubber for parts 38, 48, 84, 85, 91, 58, 62, 63, 76, 78, and other parts. I have used silver for parts 79, 86, 92, 93, 80, and other parts.

In compliance with the patent statutes I have disclosed the best form in which I have contemplated applying my invention, but it will be understood that the foregoing disclosure is illustrative of the invention rather than limiting the scope thereof.

I claim:

1. Water treating apparatus comprising: a supply tank for a liquid reagent, a constant level tank connected to receive the reagent from said supply tank, a metering valve controlling flow of the reagent from the constant level tank, means to connect the treating apparatus to apparatus pumping water to be treated, an electrically actuated valve operable to automatically start and stop the flow of the reagent upon starting and stopping of the pumping apparatus, and means to manually actuate said last mentioned valve in lieu of electrical operation thereof.

2. In water treating apparatus having a constant level tank for a liquid reagent, a metering valve controlling flow of the reagent from the constant level tank, and means to connect the treating apparatus to apparatus delivering water to be treated; the improvement which comprises: a unit in which the metering valve is incorporated, said unit having alternative connection means for locating the unit at different levels with respect to the constant level tank, to thereby vary the pressure head under which the reagent is delivered to the metering valve.

3. In water treating apparatus having a constant level tank for a liquid reagent, and means to connect the treating apparatus to apparatus delivering water to be treated; the improvement which comprises: a combination filter and metering valve unit connected to receive the reagent from said constant level tank and deliver it to the water delivering apparatus, said unit having a lower chamber to receive the reagent to be filtered, a filter element through which the reagent passes in an upward direction, an upper chamber to receive the filtered reagent, and means to conduct the filtered reagent from the upper chamber downwardly to the metering valve.

4. In water treating apparatus having a constant level tank for a liquid reagent, and means to connect the treating apparatus to apparatus delivering water to be treated; the improvement which comprises: a filter unit connected to receive and filter the reagent leaving the constant level tank, said unit having a lower chamber to receive the reagent to be filtered, a filter element through which the reagent passes in an upward direction, and an upper chamber to receive the filtered reagent, and said unit being provided with means to conduct the incoming reagent either downwardly below the filter element or upwardly toward the filter element.

5. In water treating apparatus having a constant level tank for a liquid reagent, and means to connect the treating apparatus to apparatus delivering water to be treated; the improvement which comprises: a combination filter and metering valve unit connected to receive the reagent from said constant level tank and deliver it to the water delivering apparatus, said unit passing the reagent upwardly through the filter and thence downwardly to the metering valve, and said unit having alternative connection means for locating the unit at different levels with respect to the constant level tank to thereby vary the pressure head under which the reagent is delivered to the metering valve.

6. In water treating apparatus having a constant level tank for a liquid reagent, and means to connect the treating apparatus to apparatus delivering water to be treated; the improvement which comprises: a filter unit connected to receive and filter the reagent leaving the constant level tank, said unit having a lower chamber to receive the reagent to be filtered, a filter element through which the reagent passes in an upward direction, and an upper chamber to receive the filtered reagent, said unit being provided with means to conduct the incoming reagent either downwardly below the filter element or upwardly toward the filter element, and said unit having alternative connection means for locating the unit at different levels with respect to the constant level tank to thereby vary the pressure head under which the reagent is delivered to the filter element.

SAMUEL J. PUGATZ.